United States Patent [19]

Humburg

[11] Patent Number: 5,123,594
[45] Date of Patent: Jun. 23, 1992

[54] VEHICLE HEATING SYSTEM WITH AN ENGINE-INDEPENDENT HEATER

[75] Inventor: Michael Humburg, Göppingen-Jebenhausen, Fed. Rep. of Germany

[73] Assignee: J. Eberspächer, Esslingen, Fed. Rep. of Germany

[21] Appl. No.: 542,193

[22] Filed: Jun. 21, 1990

[30] Foreign Application Priority Data

Jun. 22, 1989 [DE] Fed. Rep. of Germany ....... 3920505

[51] Int. Cl.⁵ .............................................. G05D 23/00
[52] U.S. Cl. ................... 237/2 A; 237/12.3 B
[58] Field of Search ............ 237/12.3 A, 12.3 B, 237/2 A, 12.3 C, 8 C

[56] References Cited

U.S. PATENT DOCUMENTS 4,892,248  1/1990  Robin et al. .................... 237/12.3 B Primary Examiner—Henry A. Bennett
Attorney, Agent, or Firm—McGlew & Tuttle

[57] ABSTRACT

A vehicle heating system with an engine-independent heater (2) and a heat carrier circuit (14). A feed line (24) leads from the internal combustion engine (8) driving the vehicle to the heater (2) and from there to a heating heat exchanger (10). A return line (30) leads from the heating heat exchanger (10) to the internal combustion engine (8), and a control device (6) for the heater (2). The heat carrier circuit (14) has a connection line (36) leading from the return line (30) to the feed line (24) in front of the heater (2), so that a short circuit excluding the internal combustion engine (8) is formed. The switching over from the short circuit to full heat carrier circuit is performed by the control device (6) of the heater (2) and an on-off solenoid valve (38).

10 Claims, 3 Drawing Sheets

VEHICLE HEATING SYSTEM WITH AN ENGINE-INDEPENDENT HEATER

FIELD AND BACKGROUND OF THE INVENTION

The present invention pertains to a vehicle heating system in general and more particularly to a vehicle heating system with (a) a heater that is able to generate heat by burning fuel and release it to a liquid heat carrier, (b) a heat carrier circuit including a feed line leading from the driving internal combustion engine of the vehicle to the heater and from the heater to a heating heat exchanger for the vehicle interior, and a return line leading from the heating heat exchanger to the internal combustion engine, and (c) a control device for the heater, which controls the operation of the heater, based on the heat carrier temperature determined behind the heater in the heat carrier circuit.

In conventional vehicle heaters of this class, the heat carrier heated in the heater flows through the heating heat exchanger and from there—normally with a still very high heat content—through the internal combustion engine before it again reaches the inlet side of the heater. Even though this ensures, for example, good preheating of the internal combustion engine before a cold start in winter, the heat carrier is returned to the heater in an intensely cooled state because of the considerable heat losses in lines of considerable length and due to the release of considerable amounts of heat in the internal combustion engine. Unless a very large dimensioned heater is installed, a rather long time is required for reliable deicing of the vehicle and the heating of the vehicle interior to a comfortable temperature. Valuable current is consumed from the vehicle battery during this time, aside from the fuel consumption of the heater during this period. The battery is normally very low in absolute terms. Furthermore, a large percentage of the possible heat transfer capacity of the heating heat exchanger is not utilized, especially at low outside temperatures, at which the heater is unable to heat the intensely cooled heat carrier to a desirable, high outlet temperature.

SUMMARY AND OBJECT OF THE INVENTION

It is an object of the present invention is design a vehicle heater of the class described in the introduction so that the heat released in the heater to the heat carrier is utilized primarily for the interior of the vehicle and the heat transfer capacity of the heating heat exchanger can be utilized as completely as possible.

To accomplish this task, the vehicle heater according to the present invention is characterized by the following characteristics:

(d) the heat carrier circuit has a connection line which leads from the return to the first part of the feed line located between the internal combustion engine and the heater, so that a short circuit is formed, which leads through the heater and the heating heat exchanger, bypassing the internal combustion engine;

(e) a current-actuated valve is provided for the first part of the feed line or the second part of the return, which is located between the branch of the connection line and the internal combustion engine: and (f) the current-actuated valve is controlled by the control device.

Thus, when the current-actuated valve is closed, the entire heat content of the heat carrier arriving from the heater is utilized in the heating heat exchanger, aside from the rather small heat losses to the surroundings. The current-actuated valve opens fully or partially, thus releasing the heat carrier flow path through the internal combustion engine, only when the heating heat exchanger is no longer able to sufficiently completely introduce the heat available into the interior of the vehicle, i.e., when the heat carrier temperature rises excessively as a consequence of this at the outlet side of the heater. It was found that the resulting "incidental", intermittent heating of the internal combustion engine is usually sufficient for a reliable cold start. Modern internal combustion engines reach their operating temperature in a very short time once they are started. The interior of the vehicle is heated to the desired extent much more rapidly than in the case of previous vehicle heaters. The fuel consumption of the heater and especially the power consumption from the vehicle battery are reduced.

It is pointed out that especially by preselecting the stage of the blower that is usually provided for the heating heat exchanger, the owner of the vehicle heater is able—if the high blower setting is selected—to heat the vehicle interior particularly rapidly and supply a particularly small amount of heat to the internal combustion engine or—with the low blower setting selected—to heat the vehicle interior more slowly and preheat mainly the internal combustion engine. Furthermore, one should also mention the possibility of making the setting of the blower stage and/or even the setting of the current-actuated valve dependent on the temperature of the vehicle interior, which is determined with a temperature sensor. This leads to the internal combustion engine receiving a larger portion of the heat available when the vehicle interior has been heated sufficiently. A similar effect is obtained in heating heat exchangers or vehicles which are equipped with a circulating air setting. In this case, a sufficiently heated vehicle interior means decreasing removal of heat from the heat carrier in the heating heat exchanger and, as a consequence of this, opening of the current-actuated valve. In addition, one should mention the possibility of having the blower stage or directly the current-actuated valve controlled by a timer, which switches over from the pure heating heat exchanger priority to simultaneous heating of the internal combustion engine after a selectable time (which should logically be selected to be longer in the case of low outside temperatures than at higher outside temperatures).

The heat carrier circuit may have a bypass line which leads from the first part of the feed line to the second part of the feed line located between the heater and the heating heat exchanger. This simplifies the installation of the heater in some vehicle heat carrier circuits. In addition, the heater does not have to constantly carry a flow in the shut-off state and when heat carrier is permitted to flow to the heating heat exchanger.

A great number of designs of current-actuated valves can be used for the vehicle heater according to the present invention. However, solenoid valves are especially preferred, particularly because of their simple design and their relatively low cost. In the simplest and particularly preferred case, the valve is a current-actuated valve, especially a solenoid valve, which has only two positions, namely, an open position and a closed position. However, as was indicated above, it is also possible to use a current-actuated valve with one or several, preset or variable intermediate positions. It is possible to use a current-actuated valve which has one of two positions when not energized and has the other of the two positions when energized. However, it is also possible to use a double-acting, current-actuated valve, preferably a solenoid valve, which consumes power only when switching from one position into the other.

The heat carrier temperature is preferably determined by a temperature sensor associated with the outlet side of the heater.

There are heater control devices which have a first, lower temperature switching point and a higher, second temperature switching point. The heater is conventionally switched from low output to high output at the lower switching point and from high output to low output at the higher switching point. A control device for switching off the heater at excessively high heat carrier temperature above the upper switching point is usually superimposed on this.

In the vehicle heater according to the present invention, such a control device can be advantageously used to switch the current-actuated valve. The control signal of the control device can thus be used to switch over from high heating output to low heating output and at the same time to open the current-actuated valve. Since heat carrier, which is a mixture of the heat carrier returning from the heating heat exchanger and the markedly colder heat carrier from the internal combustion engine, is now flowing to the heater, the heater is again switched to a high output after a very short time, especially after 15 to 45 sec, controlled by the control device. Switching members, especially magnetic switches, may be required for this outside the control device. However, the control device is preferably a device that integrates the functions, so that the current-actuated valve, preferably a solenoid valve, need be connected to the control device only via current-carrying lines.

The vehicle heater is even more favorable from the viewpoint of thermal engineering if the control device has a third temperature switching point above the above-described second switching point, because in this case, the current-actuated valve does not open simultaneously with the switching over of the heater to low output, but it reaches the temperature at which switching over to low output takes place only when the heat carrier returning from the internal combustion engine is still so warm that all the heat available from the heater operating in the high output setting cannot be utilized even by the heating heat exchanger and for preheating the internal combustion engine.

A preferred temperature for the first switching point is in the range of 67°–83° C., and especially preferably at circa 80° C., and a preferred temperature for the second switching point is in the range of 77°–93° C. and especially preferably at circa 90° C. The temperature of the third switching point can be slightly above the second switching point, especially preferably at circa 95° C.

The vehicle heater according to the present invention is suitable for many types of vehicles equipped with an internal combustion engine. It may be a road vehicle, a watercraft, or an aircraft. Passenger cars, trucks, buses, construction equipment, such as bulldozers and ditch diggers, and ships are primarily considered.

In most cases, the internal combustion engine is a spark-ignition engine or a diesel engine. In most cases, the heat carrier is a water-glycol mixture such as is commonly present in the cooling system of a vehicle's internal combustion engine. The heater is preferably designed for gasoline or diesel fuel as the fuel.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DETAILED DESCRIPTION OF THE PREFERRED EMBODIMENTS

Figure 1:
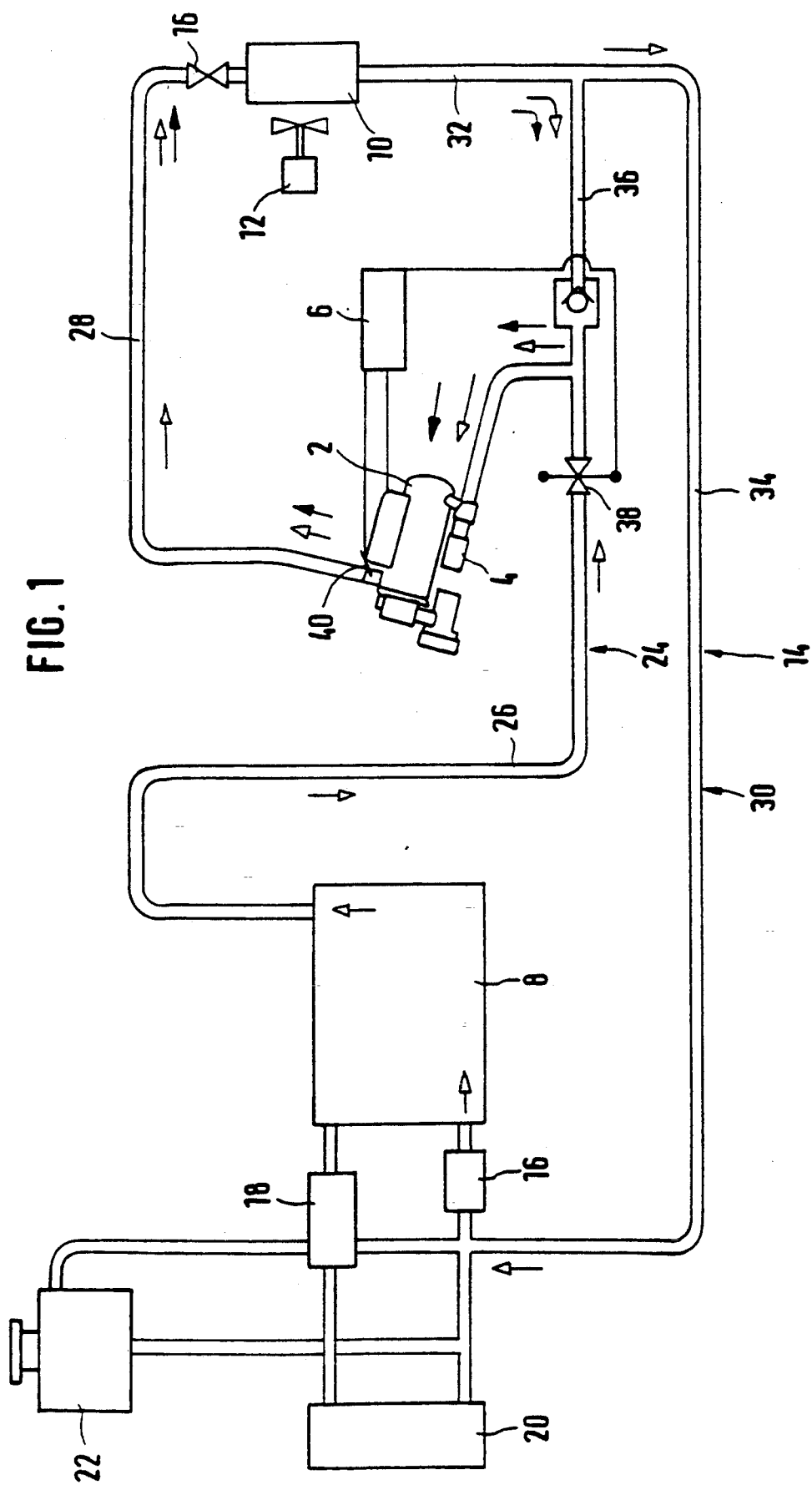
FIG. 1 is a schematic view of a vehicle heater showing a first embodiment of the heat carrier circuit; and, FIG. 2 is a schematic view of a vehicle heater drawing a second embodiment of the heat carrier circuit.

FIG. 1 shows an engine-independent heater 2 with integrated heat carrier circulating pump 4, a control device 6 for the heater 2, an internal combustion engine 8, a heating heat exchanger 10 with associated blower 12, and a heat carrier circuit 14, which has a heating valve 16 in the vicinity of the heating heat exchanger 10. The heating heat exchanger 10 is usually arranged in the area below the windshield of the vehicle and serves to heat air introduced into the interior space of the vehicle from the outside or air circulated in the interior space of the vehicle. The heater 2 is able to generate heat by burning fuel and releasing it to the heat carrier circuit 14 via a built-in heat exchanger. The internal combustion engine 8 is associated, in the conventional manner, with a coolant circulating pump 16, a thermostat valve 18, a cooler 20, and a coolant expansion tank 22. The heat carrier and the coolant are the same.

The heat carrier circuit 14 consists essentially of a feed line 24, which leads from the internal combustion engine 8 to the heating heat exchanger 10, and a return line 30, which leads from the heating heat exchanger 10 back to the internal combustion engine 8, as well as a connection line 36, which will be described below in greater detail. The feed line 24 consists of a first part 26 between the internal combustion engine 8 and the heater 2, as well as a second part 28 between the heater 2 and the heating heat exchanger 10. The return line 30 consists of a first part between the heating heat exchanger 10 and the branching point of the connection line 36, as well as a second part 34 between this branching point and the internal combustion engine 8. The connection line 36 leads from the branching point to the first part 26 of the feed line 24 at a point located relatively close to the heater 2. A check valve is provided in the connection line 36.

Figure 2:
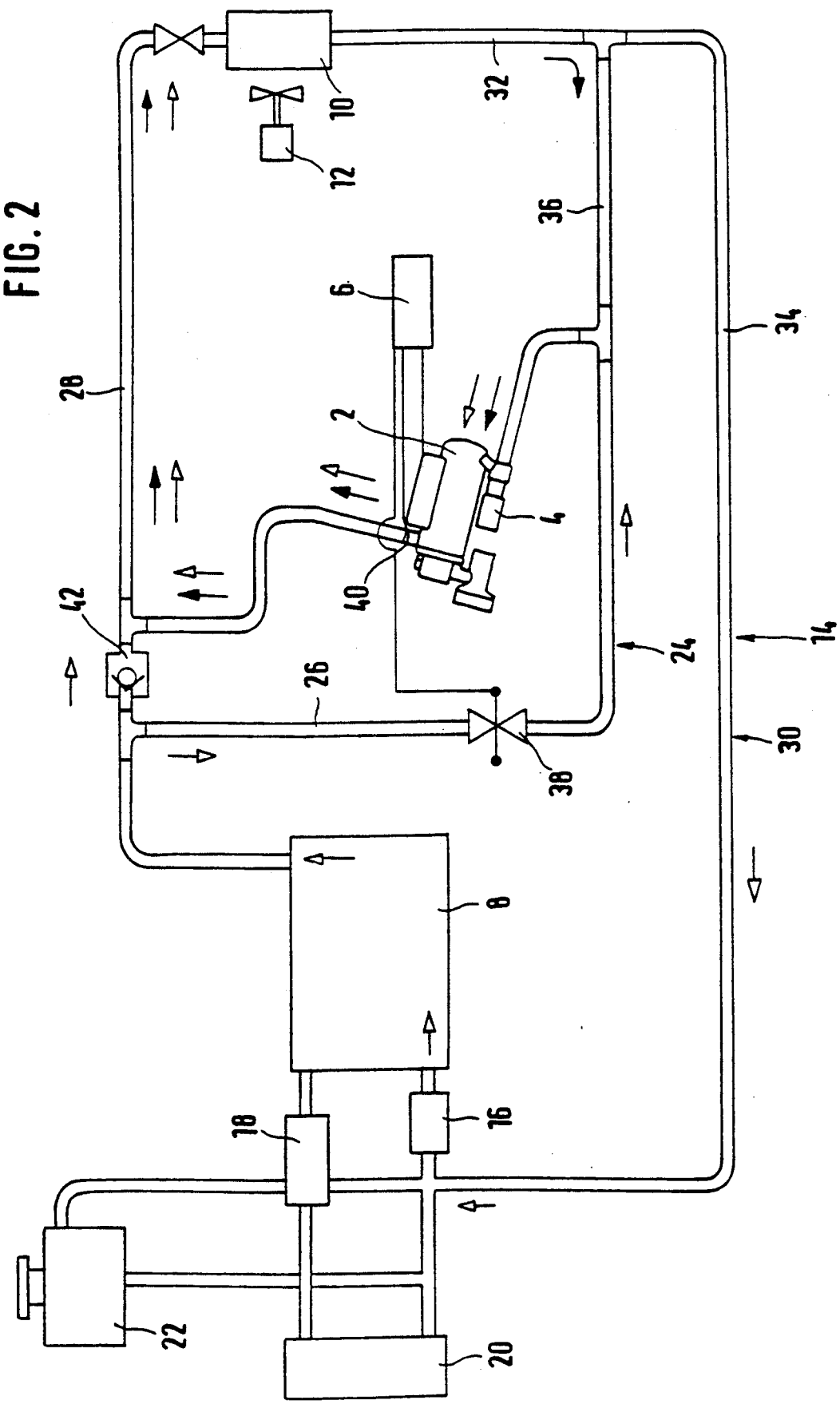
Figure 3:
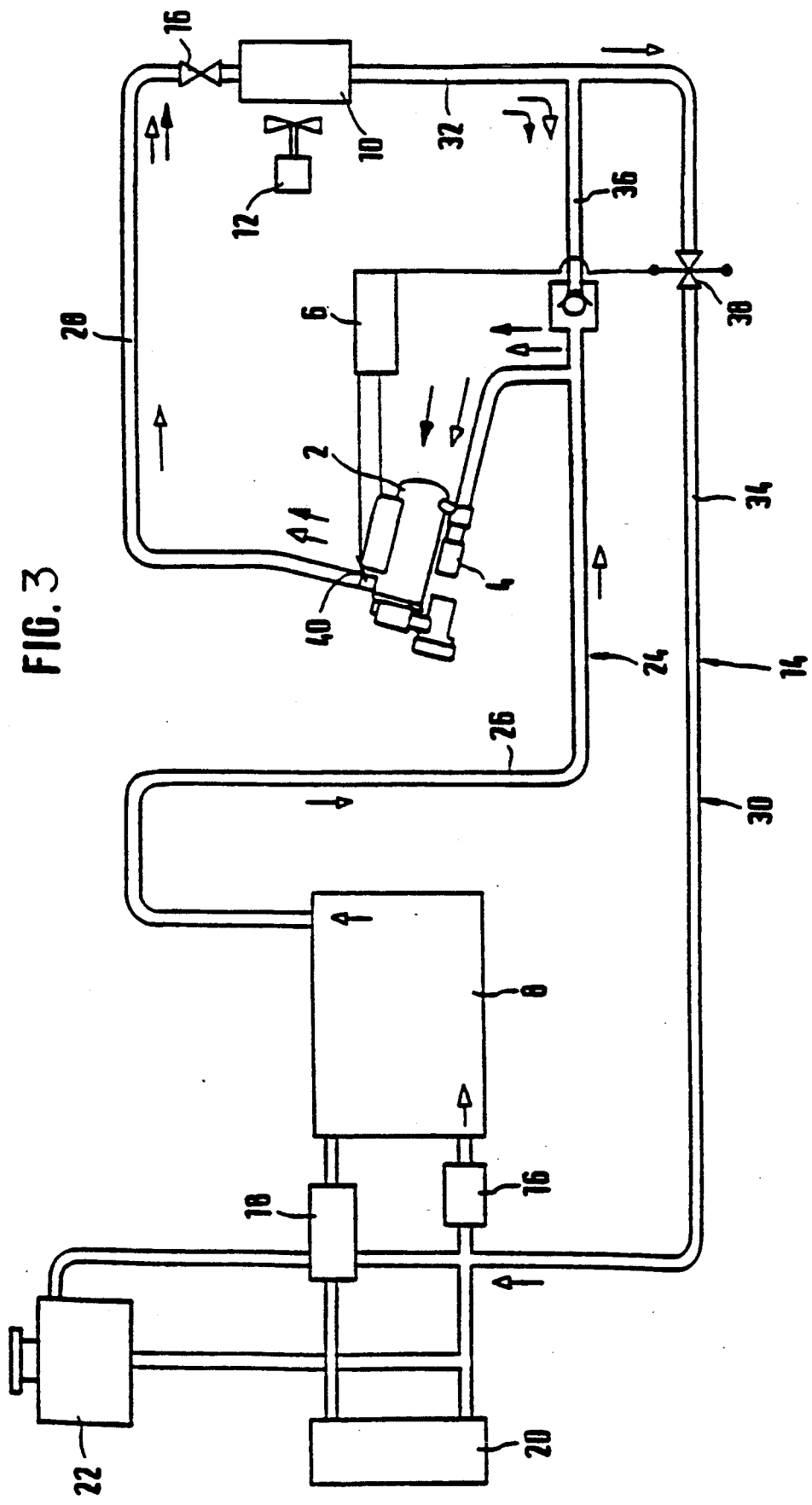
FIG. 3 is a schematic view of a vehicle heater showing a third embodiment of the heat carrier circuit.

The second part 28 of the feed line 24, the first part 32 of the return line 30, the connection line, and an end section of the first part 26 of the feed line 24 form a short circuit with rather short lines, which does not include the internal combustion engine 8 and the pipe sections leading to or from it. A solenoid valve 38, which is open when not energized and has an open position and a closed position, is located outside this short circuit, either in the first part 26 of the feed line 24 (as shown in FIGS. 1 and 2) or in the second part 34 of the return line 30 (as shown in FIG. 3). The flow of heat carrier in the short circuit is indicated by arrows with solid black tips.

A temperature sensor 40 is located at the outlet end of the heater in the feed line 24.

Providing that the heating valve 16 is open, the blower 12 is running, and the heater 2 is turned on, the vehicle heater described operates as follows:

As long as the temperature sensor 40 detects a heat carrier temperature below 90° C., the heater 2 operates, controlled by the control device 6, in the "high" output setting. The solenoid valve 38, controlled by the control device 6, is energized, and therefore it is in its closed position. Heat carrier circulates in the short circuit, corresponding to the arrows with solid black tips, and the heat carrier circulating pump causes the heat carrier to flow. Depending on the output setting of the blower 12 in the heating heat exchanger 10, the heat carrier transfers a certain percentage of its heat content that is above the ambient temperature to the air that is blown into the interior of the vehicle or is circulated therein. The heat carrier that is located in the rest of the heat carrier circuit 14 outside the short circuit does not flow because of the solenoid valve 38 being closed.

When the heating heat exchanger 10 is unable to sufficiently release the heat content of the heat carrier flowing through to the interior of the vehicle, the heat carrier temperature in the short circuit will gradually rise. When the temperature sensor 40 detects a heat carrier temperature above 90° C., the control device 6 deenergizes the solenoid valve 38, after which the solenoid valve 38 will switch to the open position. Heat carrier will now flow from the first part 26 of the feed line 24 into the short circuit (see arrows with open tips), forming a mixture. The internal combustion engine 8 receives warm heat carrier for preheating it via the second part 34 of the return line 30. The heat carrier temperature at the temperature sensor 40 drops to the lower switching point of 80° C. very rapidly, e.g., within 15–45 sec. At this moment, the control device 6 applies current to the solenoid valve 38, after which the solenoid valve 38 will close. This is followed by a new cycle with rising heat carrier temperature in the short circuit.

The above-described upper switching point of 90° C. of the control device 6 can be used only to switch over the solenoid valve 38. However, it may also be used to switch the heater 2 from the "high output" position to the "low output" position. In this case, the control device 6 again switches to the "high output" position when the lower switching point of 80° C. is reached. As an alternative, the control device 6 may have a third switching point located at 95° C. for switching the heater 2 from "high output" to "low output".

The vehicle heater and its heat carrier circuit 14 shown in FIG. 2 differ from the embodiment according to FIG. 1 only in that the feed line 24 has a bypass line 42 with a check valve. The bypass line 42 leads to a middle area of the first part 26 of the feed line 24 and to a middle area of the second part 28 of the feed line 24. In addition, the connection line 36 contains no check valve. Finally, the solenoid valve 38 is closed when not energized. The above-described function remains the same, and the solenoid valve 38 must be energized from the control device only for opening rather than for closing.

When the internal combustion engine 8 is not running, there is no flow in the bypass line 42, because the check valve located therein remains closed under the pressure occurring in the second part 28 of the feed line 24, which is located on the delivery side of the heat carrier circulating pump 4.

The above function descriptions pertained to the case of the internal combustion engine 8 not running. When the internal combustion engine 8 and consequently its coolant pump are in operation, the heater 2 may be out of operation. The solenoid valve 38 is now open in the embodiment according to FIG. 1. The check valve in the connection line 36 remains closed, because it is under the pressure occurring in the first part 26 of the feed line 24, which is located on the delivery side of the circulating pump 16. The coolant or heat carrier flows through the shut-off heater 2 and the heating heat exchanger 10 insofar as the heating valve 16 is open. In the embodiment according to FIG. 2, the solenoid value 38 is closed. The heat carrier arriving from the internal combustion engine 8 flows through the bypass line 42 and thus reaches the heating heat exchanger 10 insofar as the heating valve 16 is open.

The heater 2 may also operate as an auxiliary heater. In the case of the embodiment according to FIG. 1, the heat carrier is now additionally heated in the heater 2, and the control device 6 ensures that the solenoid valve 38 is always open. In the embodiment according to FIG. 2, the heat carrier in the feed line 24 is branched between the bypass line 42 and the part of the feed line 24 passing through the heater 2. The part of the feed line heat carrier flowing through the heater 2 is additionally heated there. The control device 6 ensures that the solenoid valve 38 remains open.

When the internal combustion engine 8 is not in operation, the flow resistances in the part of the heat carrier circuit located outside the short circuit are so great that the part of heat carrier flowing through the internal combustion engine 8 is smaller than the part of the heat carrier circulating in the short circuit.

Existing heat carrier circuits of vehicles can be retrofitted to heat carrier circuits and an engine-independent heater 2 according to the present invention in a very simple manner.

While specific embodiments of the invention have been shown and described in detail to illustrate the application of the principles of the invention, it will be understood that the invention may be embodied otherwise without departing from such principles.

What is claimed is:

1. A vehicle heating system for heating a vehicle, the vehicle including an internal combustion engine for driving the vehicle, comprising: a fuel burning heater for generating heat and releasing heat to a liquid heat carrier; a heat carrier circuit including a feed line leading from the internal combustion engine to a heating heat exchanger for exchanging heat between the liquid carrier and the interior of the vehicle, and a return line having a first and second part which leads from the heating heat exchanger to the internal combustion engine; control means for controlling the operation of the heater as a function of the heat carrier temperature detected in the heat carrier circuit downstream of the heater; a connection line leading from between said first and second parts of said return line to a first part of the feed line, said first part of the feed line being located between the internal combustion engine and the heater, said connecting line forming a short circuit leading through the heater and the heating heat exchanger, bypassing the internal combustion engine; a second part of said feed line being located between said heater and said heating heat exchanger; a current actuated valve located between a branch of the connection line and the internal combustion engine in the first part of the feed line; and, connection means connecting said current actuated valve to said control device for controlling said current actuated valve at said control device.

2. A vehicle heating system according to claim 1, wherein the heat carrier circuit includes a bypass line leading from the first part of the feed line to the second part of the feed line, located between the heater and the heat exchanger.

3. A vehicle heating system according to claim 1, wherein said current-actuated valve is a solenoid valve.

4. A vehicle heating system according to claim 1, wherein said heater includes a temperature sensor positioned at a heat carrier outlet of said heater, said temperature sensor being connected to said control device.

5. A vehicle heating system according to claim 1, wherein the control devicing includes a first lower temperature switching point and a second higher temperature switching point, said control device closing said current-actuated valve at said first switching point in openings said current-actuated valve at said second switching point.

6. A vehicle heating system according to claim 5, wherein said control device switches said heater over to a lower heat generation setting at one of said second switching point and at a higher, third temperature switching point.

7. A vehicle heating system according to claim 5, wherein said first switching point is in the range of from 67° to 83° C. and said second switching point is in the range of from 77° to 93° C.

8. A vehicle heating system according to claim 1, wherein; said connection line has a check valve.

9. A vehicle heating system in accordance with claim 2, wherein; said bypass line has a check valve.

10. A vehicle heating system for heating a vehicle, the vehicle including an internal combustion engine for driving the vehicle, comprising; a fuel burning heater for generating heat and releasing heat to a liquid heat carrier; a heat carrier circuit including a feed line leading from the internal combustion engine to a heating heat exchanger for exchanging heat between the liquid carrier and the interior of the vehicle, and a return line having a first and second part which leads from the heating heat exchanger to the internal combustion engine; control means for controlling the operation of the heater as a function of the heat carrier temperature detected in the heat carrier circuit downstream of the heater; a connection line leading from between said first and second parts of said return line to a first part of the feed line, said first part of the feed line being located between the internal combustion engine and the heater, said connecting line forming a short circuit leading through the heater and the heating heat exchanger, bypassing the internal combustion engine; a second part of said feed line being located between said heater and said heating heat exchanger; a current actuated valve located between a branch of the connection line and the internal combustion engine in a second part of the return line; and, connection means connecting said current actuated valve to said control device for controlling said current actuated valve at said control device.

* * * * *